United States Patent
Andersen

(10) Patent No.: US 11,624,256 B2
(45) Date of Patent: Apr. 11, 2023

(54) DOWNHOLE PACKER ASSEMBLY

(71) Applicant: WELLTEC A/S, Allerød (DK)

(72) Inventor: Tomas Sune Andersen, Allerød (DK)

(73) Assignee: Welltec A/S, Allerød (DK)

( * ) Notice: Subject to any disclaimer, the term of this patent is extended or adjusted under 35 U.S.C. 154(b) by 0 days.

(21) Appl. No.: 17/534,078

(22) Filed: Nov. 23, 2021

(65) Prior Publication Data

US 2022/0162924 A1 May 26, 2022

(30) Foreign Application Priority Data

Nov. 24, 2020 (EP) .................................... 20209615

(51) Int. Cl.
*E21B 33/127* (2006.01)
*E21B 33/128* (2006.01)

(52) U.S. Cl.
CPC ........ *E21B 33/1277* (2013.01); *E21B 33/127* (2013.01); *E21B 33/128* (2013.01)

(58) Field of Classification Search
CPC .. E21B 33/127; E21B 33/128; E21B 33/1277; E21B 33/134
See application file for complete search history.

(56) References Cited

U.S. PATENT DOCUMENTS

2007/0199693 A1*  8/2007  Kunz .................... E21B 33/128
                                                                166/179

FOREIGN PATENT DOCUMENTS

| AU | 2013/100386 | 3/2013 |
| EP | 3 517 728 | 7/2019 |

OTHER PUBLICATIONS

Extended Search Report for EP20209615, dated Apr. 13, 2021, 9 pages.

* cited by examiner

Primary Examiner — Yong-Suk (Philip) Ro
(74) Attorney, Agent, or Firm — Nixon & Vanderhye P.C.

(57) ABSTRACT

A downhole packer assembly includes a body part, an expandable tubular packer element surrounding the body part, and a first end and a second end of the expandable tubular packer element are fixedly connected with the body part, providing an expandable space fillable with liquid during expansion, and a metal sleeve surrounding the expandable tubular packer element. A restriction unit has an axially movable part movable between a first axial position in which the axially movable part at least partly overlaps the expandable tubular packer element and a second axial position in which the axially movable part has been axially displaced in relation to the body part away from the expandable tubular packer element.

18 Claims, 6 Drawing Sheets

DOWNHOLE PACKER ASSEMBLY

Figure 1:
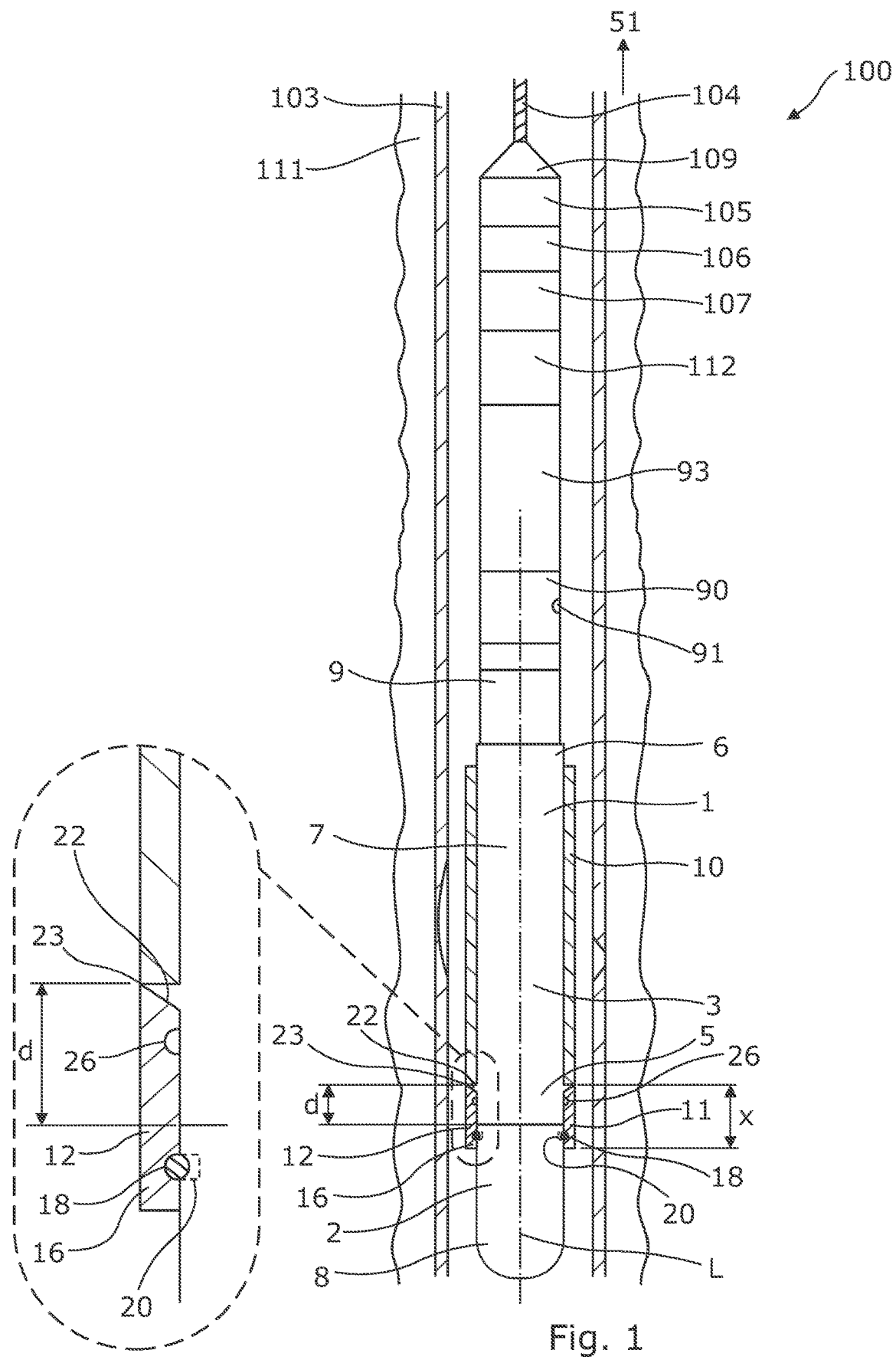

This application is the U.S. national phase of International Application No. 20209615.2 filed 24 Nov. 2020, the entire contents of each of which are hereby incorporated by reference.

The present invention relates to a downhole packer assembly for expansion of a metal sleeve, such as a metal patch, in a well downhole in a well tubular metal structure. The invention also relates to a downhole system comprising the downhole packer assembly and a driving unit, such as a downhole tractor, for propelling the downhole packer assembly in the well tubular metal structure.

When expanding a metal patch within a well tubular metal structure by means of a wireline tool, it is important to be able to run the unexpanded patch into the well without risking that the patch falls off the tool if power is temporarily lost. When using drill pipe or coiled tubing conveyed tools, there is no risk that the electrical power will be switched off since the pipe/tubing transports the pressurised fluid for expanding the patch, and thus no electrical power downhole is needed.

It is an object of the present invention to wholly or partly overcome the above disadvantages and drawbacks of the prior art. More specifically, it is an object to provide an improved downhole packer assembly for expanding a metal patch within a well tubular metal structure without the risk of losing an unexpanded or only partly expanded metal patch downhole.

The above objects, together with numerous other objects, advantages and features, which will become evident from the below description, are accomplished by a solution in accordance with the present invention by a downhole packer assembly for expansion of a metal sleeve, such as a metal patch, in a well downhole in a well tubular metal structure, the well having a top comprising:
- a body part having an axial extension, a first end facing downhole and a second end facing uphole towards the top of the well,
- an expandable tubular packer element surrounding the body part, and a first end and a second end of the expandable tubular packer element are fixedly connected with the body part, providing an expandable space therebetween, the expandable space being fillable with liquid during expansion, and
- a metal sleeve surrounding the expandable tubular packer element,
wherein the downhole packer assembly further comprises a restriction unit comprising an axially movable part, the axially movable part having a first part end facing the first end of the expandable tubular packer element and a second part end facing away from the expandable tubular packer element, the axially movable part having a first position in which the axially movable part at least partly overlaps the expandable tubular packer element and a second position in which the axially movable part has been axially displaced in relation to the body part away from the expandable tubular packer element.

Additionally, the present invention also relates to a downhole packer assembly for expansion of a metal sleeve, such as a metal patch, in a well downhole in a well tubular metal structure, the well having a top comprising:
- a body part having an axial extension, a first end facing downhole and a second end facing uphole towards the top of the well,
- an expandable tubular packer element surrounding the body part, and a first end and a second end of the expandable tubular packer element are fixedly connected with the body part, providing an expandable space therebetween, the expandable space being fillable with liquid during expansion, and
- a metal sleeve surrounding the expandable tubular packer element,
wherein the downhole packer assembly further comprises a restriction unit comprising an axially movable part, the axially movable part having a first axially movable part end facing the first end of the expandable tubular packer element and a second axially movable part end facing away from the expandable tubular packer element, the axially movable part having a first state in which the axially movable part is in a first axial position at least partly overlaps the expandable tubular packer element and a second state in which the axially movable part is in a second axial position axially displaced in relation to the first axial position away from the expandable tubular packer element.

Moreover, the axially movable part may have a length along the axial extension and may overlap the expandable tubular packer element by a distance being more than 10% of the length, preferably more than 25% of the length, and even more preferably more than 50% of the length.

Furthermore, the axially movable part may have a length along the axial extension and may overlap the expandable tubular packer element by a distance being more than 10% of the length in the first axial position.

Also, the distance in the second axial position may be less than the distance in the first axial position.

Additionally, the metal sleeve may have an unexpanded state in which the metal sleeve is in contact with the restriction unit, and in an expanded state of the metal the metal sleeve, is out of contact with the restriction unit.

Further, the axially movable part may move from the first axial position to the second axial position as the expandable tubular packer element expands and forces the axially movable part away from the expandable tubular packer element.

In addition, the first part end of the axially movable part may have an inclined face inclining from an end point radially inwards towards the body part.

Also, the first part end of the axially movable part may have an inclined face facing an outer face of the expandable tubular packer element in the first axial position.

Furthermore, the first part end of the axially movable part may have an inclined face inclining from an end point radially inwards towards an inner face of the axially movable part.

Moreover, the axially movable part may be ring-shaped.

Further, the expandable tubular packer element may have an outer face having a friction coefficient, the axially movable part being maintained in the first axial position by friction between the outer face and inner face of the first part of the axially movable part.

In addition, the body part may have a projection increasing the outer diameter of the body part that is larger than an inner diameter of the axially movable part.

Also, the axially movable part may be maintained in the first axial position by a shear pin.

Furthermore, the axially movable part may be maintained in the first axial position by a snap ring or a spring-loaded element movable in a first groove in the body part and engaging a first indentation in an inner face of the axially movable part.

Moreover, the axially movable part may have a second indentation arranged in the inner face of the axially movable part at a distance from the first indentation and closer to the metal sleeve than the first indentation.

Further, the restriction unit may comprise a second part fixedly connected to the body part.

In addition, the second part may have a plurality of second arms having an inner face provided with grooves for engaging an outer face of the body part.

Also, each second arm may have an outer face inclining away from the axially movable part.

Furthermore, the second part may comprise a fastening ring for sliding onto the outer face of the second arms, forcing the grooves of the inner face into engagement with the outer face of the body part.

Moreover, the second part may be a projection on the body part.

Further, the second part may be a snap ring or a spring-loaded element movable radially and axially fixated in a first groove in the body part.

In addition, the restriction unit may be a first restriction unit.

Also, the downhole packer assembly may comprise a second restriction unit comprising an axially movable part, the axially movable part having a first part end facing the first end of the expandable tubular packer element and a second part end facing away from the expandable tubular packer element, the axially movable part having a first axial position in which the axially movable part at least partly overlaps the expandable tubular packer element and a second axial position in which the axially movable part has been axially displaced in relation to the body part away from the expandable tubular packer element towards the top of the well.

Further, the axially movable part and/or the second part of the restriction unit may have a base part and extending arms each having an inwardly extending projection.

In addition, the arms may have a thickness smaller than a thickness of the base part.

Also, the arms may be more flexible than the base part.

Furthermore, the base part may have openings for screwing the base part to the body part.

Moreover, the axially movable part may be ring-shaped, the second part end having an annular projection, and the axially movable part comprising an intermediate section having an outer diameter smaller than that of the annular projection.

Further, the first part end of the axially movable part may have an inclined face facing the metal sleeve.

In addition, the inclined face may correspond to an inclined face at the end of the metal sleeve. Hereby is meant that the inclined face matches the inclined face at the end of the metal sleeve.

Also, the axially movable part may have an indentation in an outer face of the axially movable part.

Finally, the present invention relates to a downhole system comprising the downhole packer assembly and a driving unit, such as a downhole tractor, for propelling the downhole packer assembly in the well tubular metal structure.

Figure 2A:
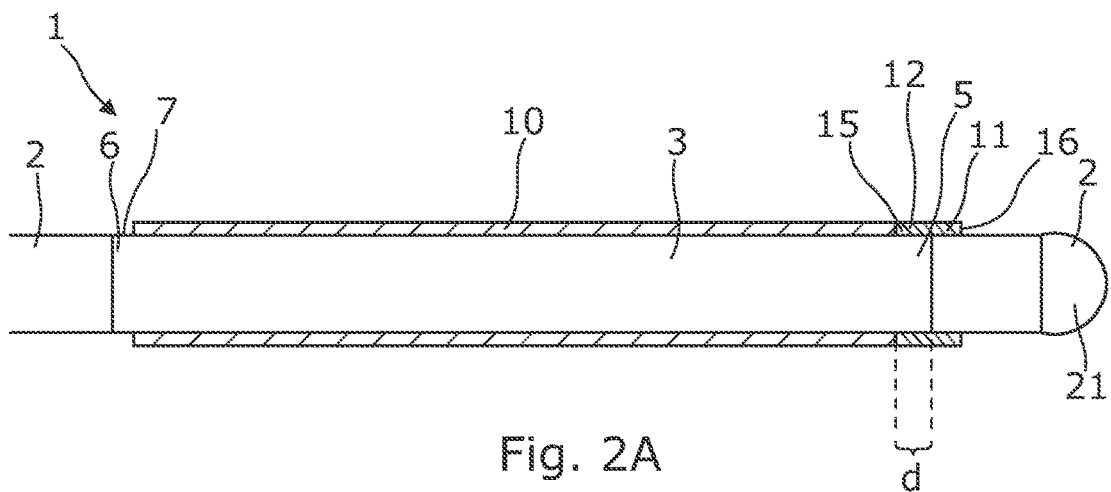
Figure 2B:
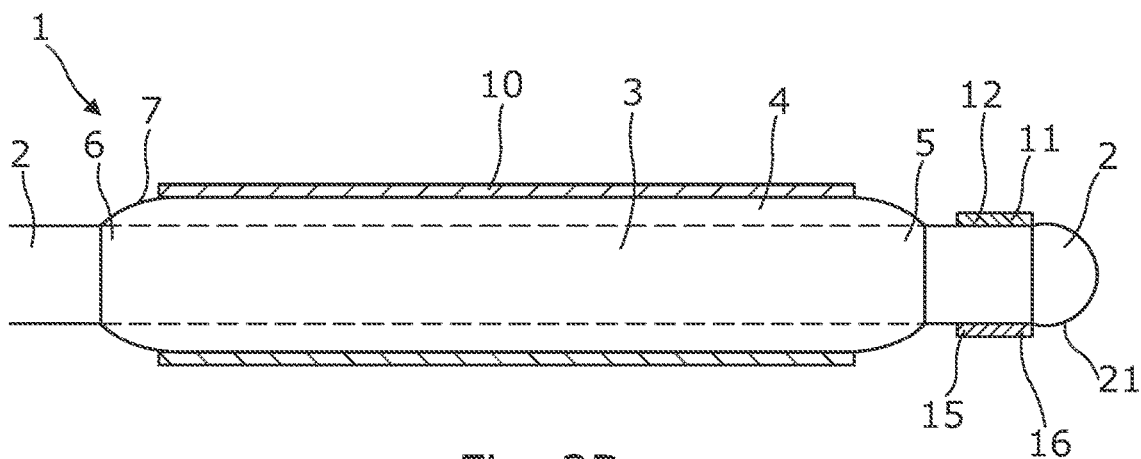
Figure 3:
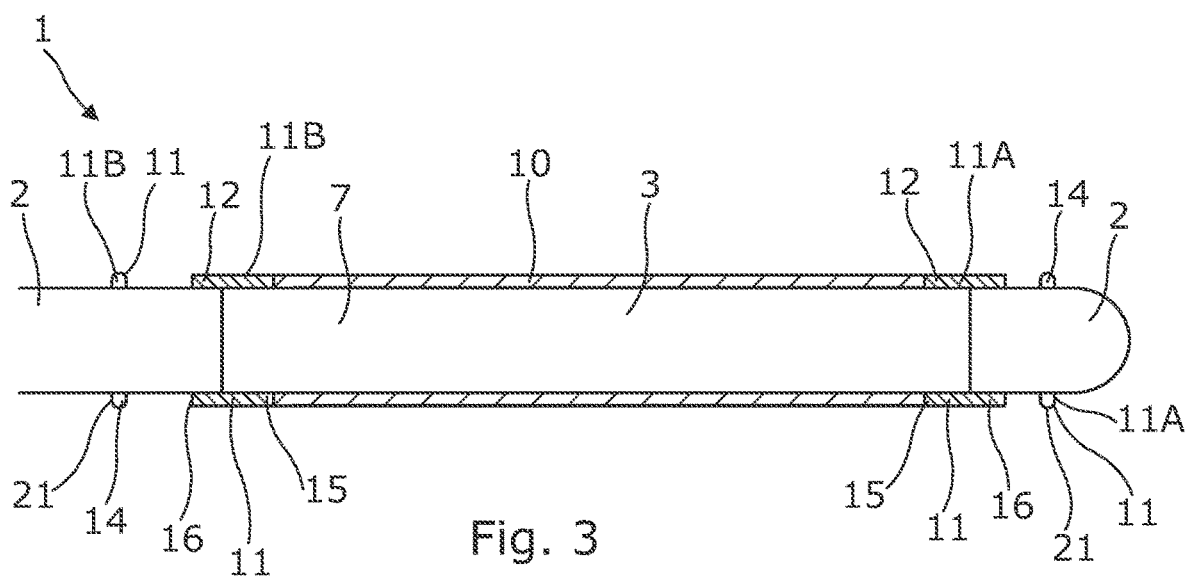
Figure 4:
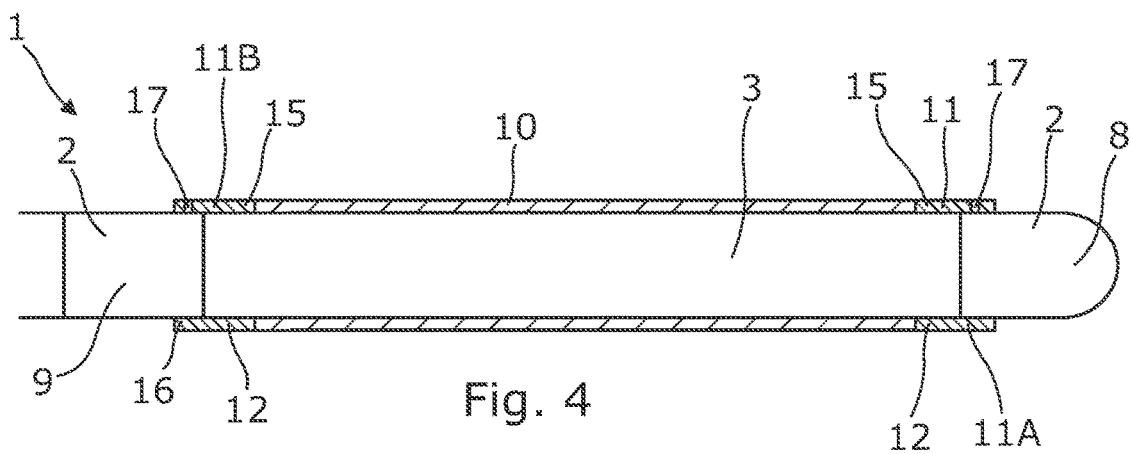
Figure 5:
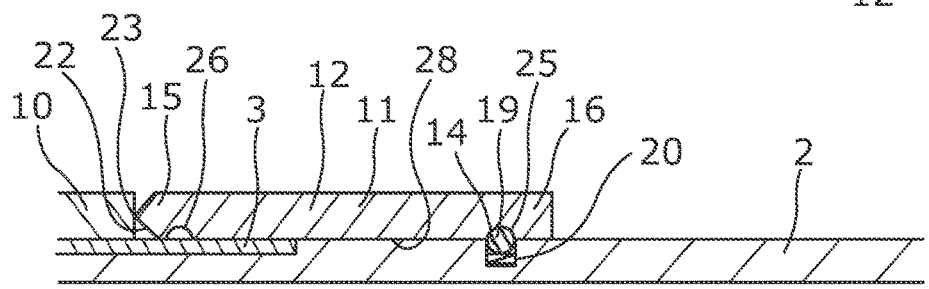
Figure 6:
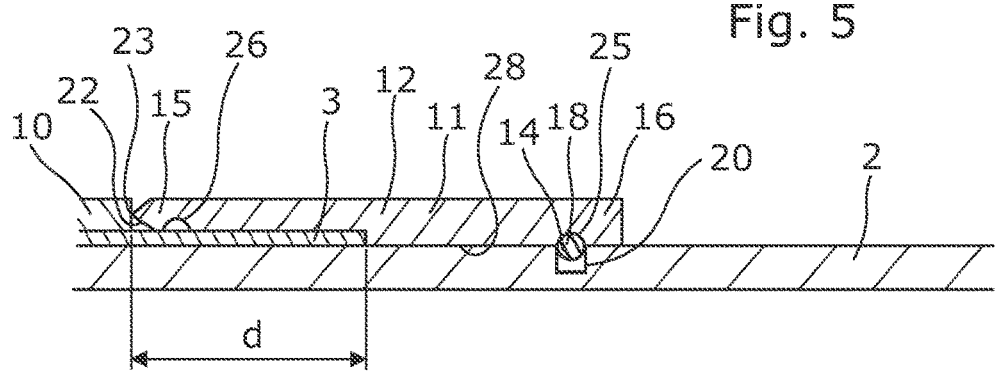
Figure 7:
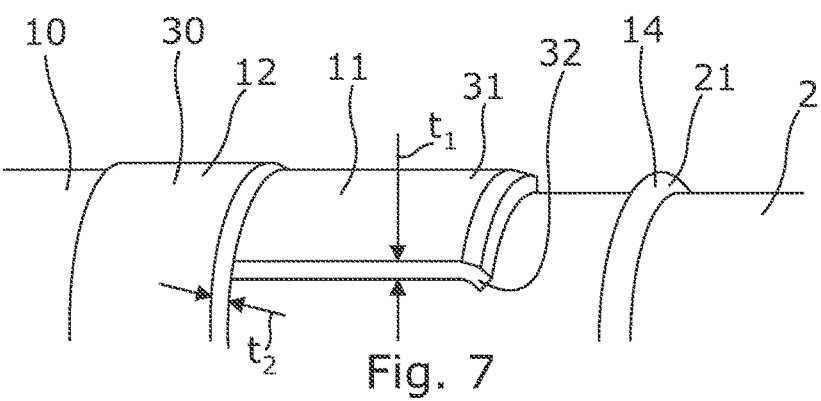
Figure 8:
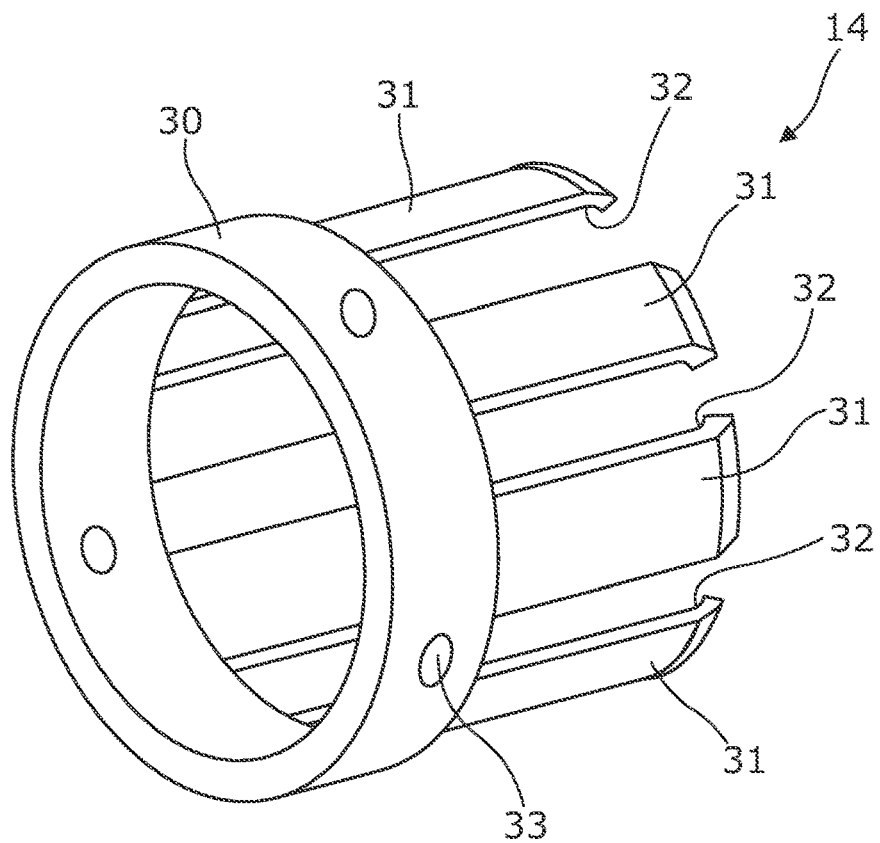
Figure 9:
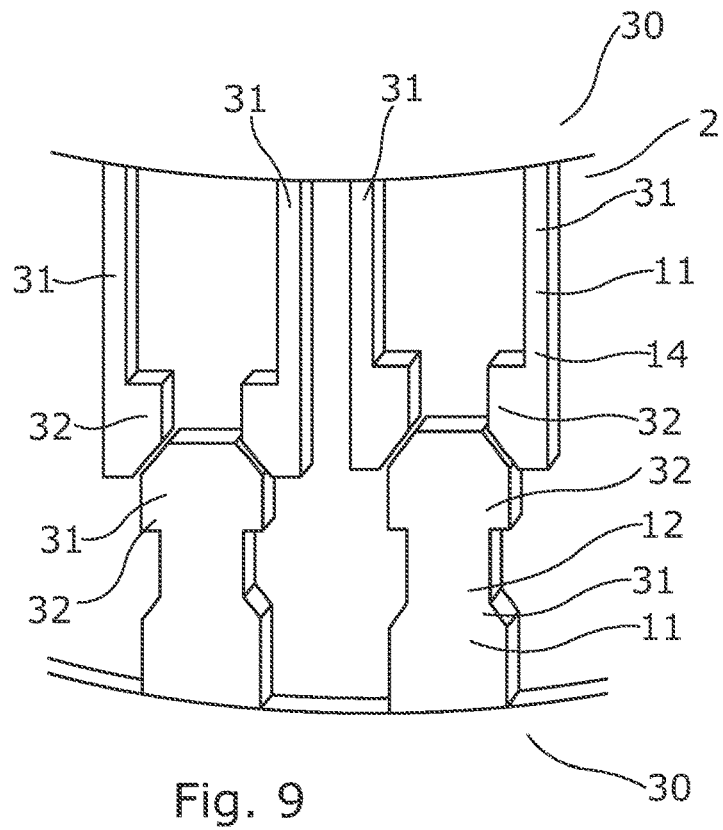
Figure 10A:
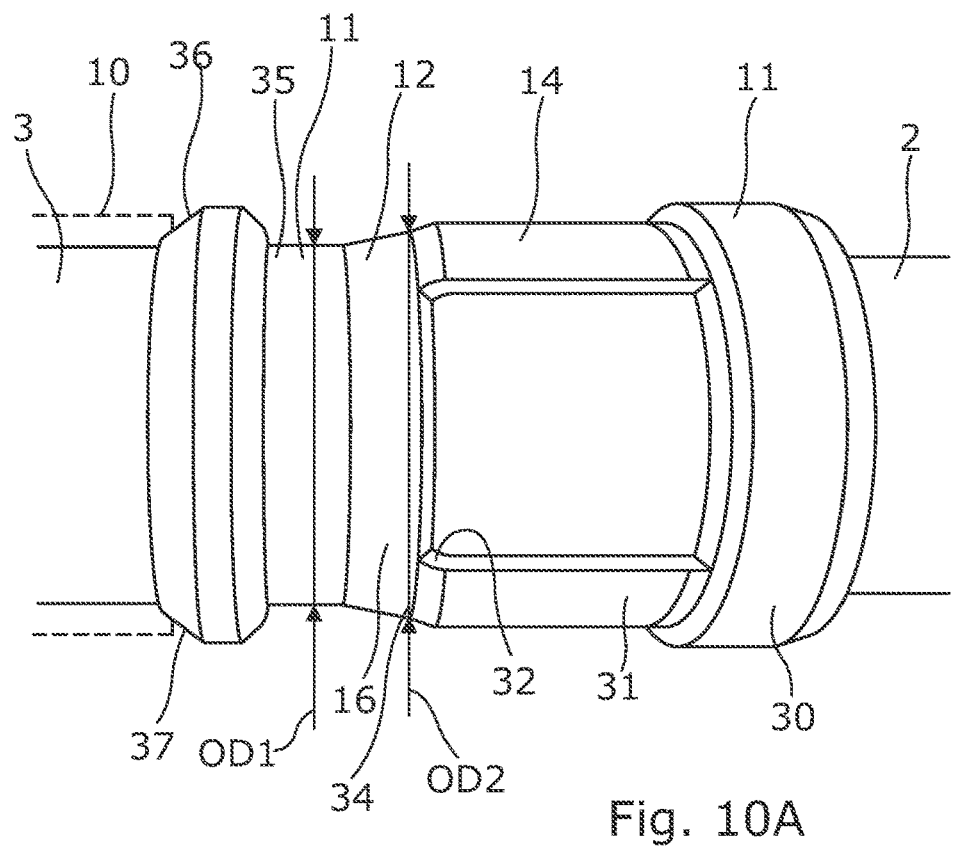
Figure 10B:
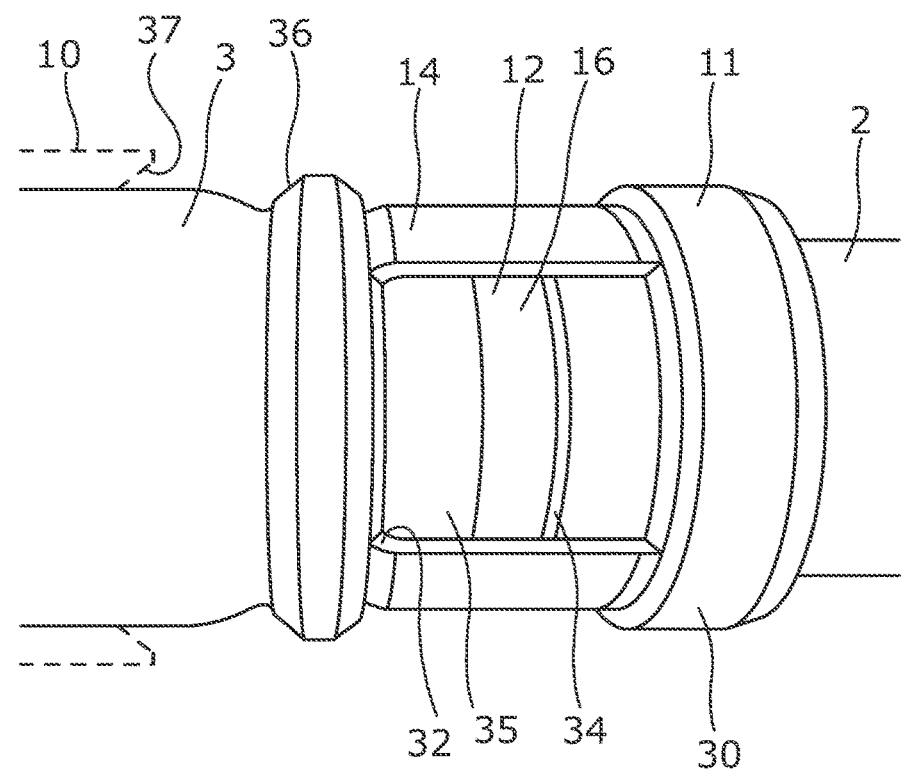
Figure 11:
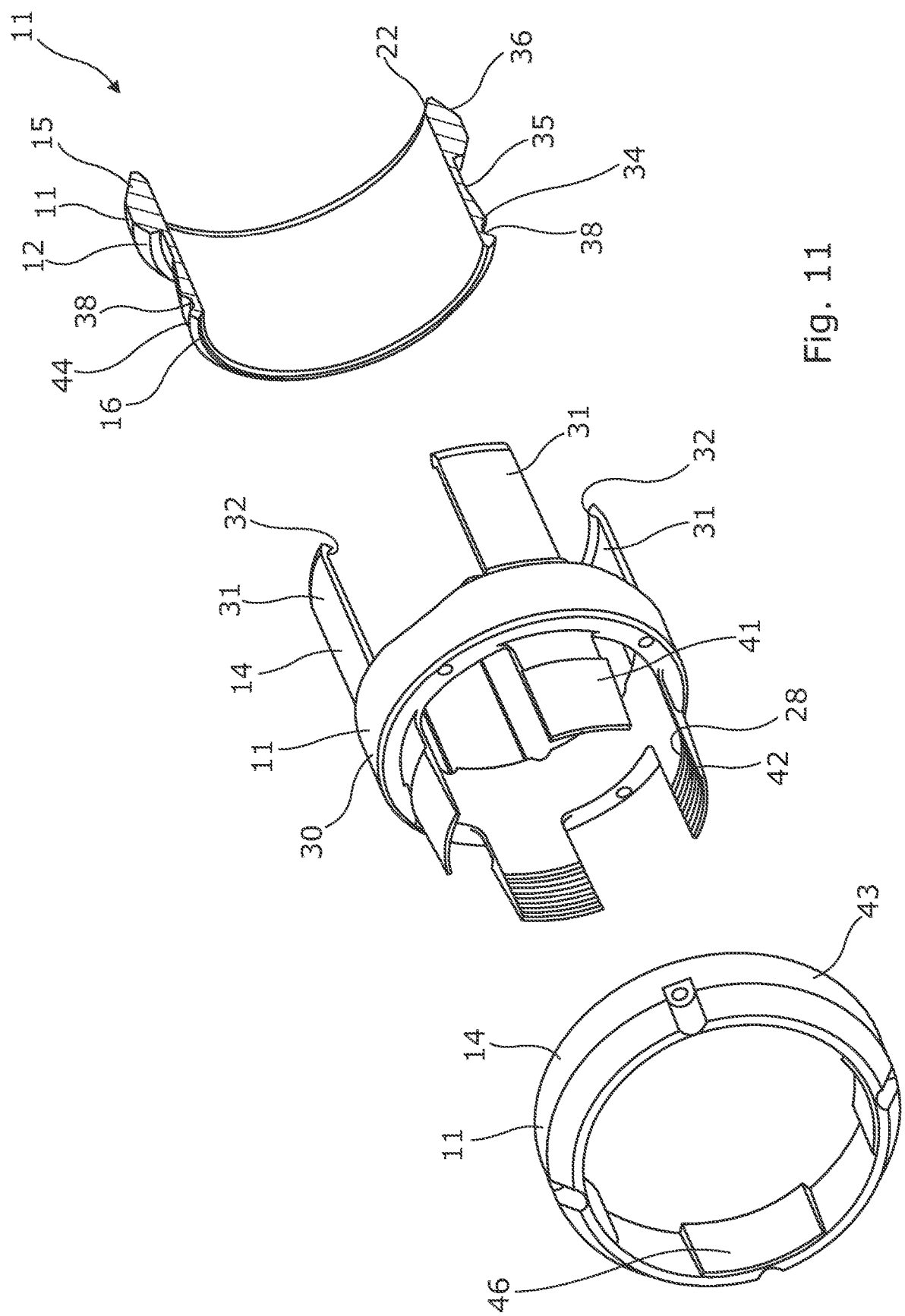

The invention and its many advantages will be described in more detail below with reference to the accompanying schematic drawings, which for the purpose of illustration show some non-limiting embodiments and in which:

FIG. 1 shows a partly cross-sectional view of a downhole packer assembly in a well, where the metal patch to be expanded is shown in its unexpanded condition, FIG. 2A shows a partly cross-sectional view of another downhole packer assembly in an unexpanded condition of the metal patch, FIG. 2B shows the downhole packer assembly of FIG. 2B in its expanded condition, FIG. 3 shows a partly cross-sectional view of another downhole packer assembly in an unexpanded condition of the metal patch, FIG. 4 shows a partly cross-sectional view of yet another downhole packer assembly in an unexpanded condition of the metal patch, FIG. 5 shows a cross-sectional view of part of a downhole packer assembly, FIG. 6 shows a cross-sectional view of part of another downhole packer assembly, FIG. 7 shows a perspective of part of yet another downhole packer assembly, FIG. 8 shows a perspective of a second part of a restriction unit, FIG. 9 shows part of a restriction unit, FIG. 10A shows a perspective of part of yet another downhole packer assembly, FIG. 10B shows part of the downhole packer assembly of FIG. 10B in its expanded condition, and FIG. 11 shows an exploded view of a restriction unit.

All the figures are highly schematic and not necessarily to scale, and they show only those parts which are necessary in order to elucidate the invention, other parts being omitted or merely suggested.

FIG. 1 shows a downhole packer assembly 1 for expansion of a metal sleeve, such as a metal patch 10, in a well 111 downhole in a well tubular metal structure 103, the well having a top 51. The downhole packer assembly 1 comprises a body part 2 having an axial extension L, a first end 8 facing downhole and a second end 9 facing uphole towards the top of the well. The downhole packer assembly 1 further comprises an expandable tubular packer element 3 surrounding the body part 2, and a first end 5 and a second end 6 of the expandable tubular packer element 3 are fixedly connected with the body part 2, providing an expandable space 4 (shown in FIG. 2B) therebetween, and the expandable space 4 being fillable with liquid during expansion in order to expand the expandable tubular packer element 3 and a metal sleeve 10 surrounding the expandable tubular packer element 3. The downhole packer assembly 1 further comprises a restriction unit 11, 11A for restricting the expandable tubular packer element 3 from moving along the axial extension or falling off while running the downhole packer assembly 1 into the vertical part of the well tubular metal structure. The downhole packer assembly 1 may also bump into restrictions in the well which may force the expandable tubular packer element 3 to move if not restricted from doing so by the restriction unit 11. The restriction unit 11 comprises an axially movable part 12 having a first part end 15 (shown in FIG. 2A) facing and abutting the first end of the expandable tubular packer element 3 and a second part end 16 facing away from the expandable tubular packer element 3 along the axial extension. The axially movable part 12 has a first state in which the axially movable part 12 is in a first axial position at least partly overlaps and abuts the expandable tubular packer element 3 (as shown in FIG. 2A) and a second state in which the axially movable part 12 is in a second axial position and has been axially displaced in relation to the first axial position along the body part 2 away from the expandable tubular packer element 3 (as shown in FIG. 2B).

By having an axially movable part moving from a first axial position and a second axial position by means of expanding the expandable tubular packer element 3, a simple restriction of the metal patch 10 is accomplished so that an unexpanded or partly expanded metal patch 10 is not lost in the well if the power is temporarily lost during conveying the downhole packer assembly 1 in the well tubular metal structure. The restriction unit 11 is able to maintain the metal patch 10 in the intended position without restricting the ends of the metal patch 10 from expanding.

As shown in FIG. 1, the metal sleeve has an unexpanded state in which the metal sleeve is in contact and abuts with the restriction unit, and in an expanded state of the metal sleeve, the metal sleeve is out of contact with the restriction unit.

The downhole packer assembly 1 in FIG. 1 also comprises a positive displacement pump 93 for pumping liquid into the expandable space 4 to expand the expandable tubular packer element 3. The positive displacement pump 93 is connected to the top via a wireline 104 and a cable head 109. The positive displacement pump 93 comprises an electrical control 105. The positive displacement pump 93 comprises a motor 106 driving a second pump. The positive displacement pump 93 further comprises a compensator 107 for keeping a predetermined overpressure in the positive displacement pump 93 compared to the surrounding pressure. The positive displacement pump 93 further comprises a driving means 112 to the movement of a first piston in the pump housing in a first direction or a second direction. In FIG. 1, the positive displacement pump 93 further comprises a discharge control unit 90 having an aperture 91 for discharging fluid in the expandable tubular packer element 3 of the downhole packer assembly 1 in order to deflate the expandable tubular packer element 3. The downhole packer assembly 1 is shown in its deflated position. The discharge control unit 90 may be a flow-operated discharge control unit 90.

In FIG. 1, the axially movable part 12 has a length x along the axial extension L and overlaps the expandable tubular packer element 3 by a distance d (also shown in FIG. 6) which is more than 10% of the length x, preferably more than 25% of the length x, and in FIG. 1 more than 50% of the length x in the first axial position. When the expandable space 4 of the expandable tubular packer element 3 is pressurised and thus expands, the axially movable part 12 is forced to move from the first axial position to the second axial position in that the radial expansion of the expandable tubular packer element 3 forces the axially movable part 12 to slide away from the expandable tubular packer element 3. The distance d is thus at least 10% of the length x in the first axial position, and in the second axial position the distance is less than the distance in the first axial position as the expandable tubular packer element 3 has moved the axially movable part 12 along the axial extension L.

In another embodiment, the axially movable part 12 may at least partly overlap an end of the metal sleeve 10, and once the axially movable part 12 slides at least partly off the expandable tubular packer element 3, the axially movable part 12 moves from the first axial position in which it overlaps the metal sleeve 10 to the second axial position where the metal sleeve 10 is free to move radially outwards along with the expandable tubular packer element 3.

The first part end 15 of the axially movable part 12 has an inclined face 22 (also shown in FIGS. 5 and 6) inclining from an end point 23 radially inwards towards the body part 2. Once the expandable tubular packer element 3 starts to expand, the inclined face 22 assists the axially movable part 12 in moving towards the first end 8 of the body part 2 and thus sliding off the expandable tubular packer element 3. The axially movable part 12 is ring-shaped but may have any suitable shape and may be a two-part sleeve which is assembled and fastened around the body part 2 and the expandable tubular packer element 3.

As shown in FIGS. 1 and 6, the axially movable part 12 is maintained in the first axial position by a snap ring 18 radially movable in a first groove 20 in the body part 2 and engaging a first indentation 25 in an inner face of the axially movable part 12. The axially movable part 12 has a second indentation 26 arranged in the inner face of the axially movable part 12 at a distance from the first indentation 25 and closer to the metal sleeve 10 than the first indentation. In this way, the second indentation 26 engages the snap ring 18 when the axially movable part 12 moves from the first axial position to the second axial position, and the axially movable part 12 is thus locked in the second axial position so that the axially movable part 12 does not slide fully off the body part 2.

In one embodiment, the expandable tubular packer element 3 has an outer face 7 having a friction coefficient, and the axially movable part 12 is maintained in the first axial position by friction between the outer face and an inner face of the first part of the axially movable part 12.

In FIGS. 2A and 2B, the body part 2 has a projection 21 increasing the outer diameter of the body part 2 so that the outer diameter of the projection 21 is larger than an inner diameter of the axially movable part 12, and the projection 21 thus prevents the axially movable part 12 from sliding off the body part 2, as shown in FIG. 2B. In FIG. 3, the body part 2 has two projections 21 arranged at a distance from each of the axially movable parts 12 in the first axial position in order to prevent the axially movable parts 12 from sliding off the body part 2.

In FIG. 4, the downhole packer assembly 1 comprises a first restriction unit 11, 11A in a first end 8 and a second restriction unit 11, 11B in the second end 9. Each restriction unit 11 comprises the axially movable part 12, which is maintained in the first axial position by a shear pin 17. Once the expandable tubular packer element 3 starts to expand, a force starts to press on both the first and the second restriction unit 11A, 11B, and when the force becomes higher than a predetermined force, the shear pins 17 break and the axially movable parts 12 are forced to move away from the expandable tubular packer element 3.

The axially movable part 12 may also be maintained in the first axial position by a spring-loaded element 19, as shown in FIG. 5, which is movable in a first groove 20 in the body part 2 and engaging a first indentation 25 in an inner face 28 of the axially movable part 12. The axially movable part 12 has a second indentation 26 arranged in the inner face 28 of the axially movable part 12 at a distance from the first indentation 25 and closer to the metal sleeve 10 than the first indentation 25. In this way, the second indentation 26 engages the spring-loaded element 19 when the axially movable part 12 moves from the first axial position to the second axial position, and the axially movable part 12 is thus locked in the second axial position so that the axially movable part 12 does not slide fully off the body part 2.

As shown in FIGS. 3, 7 and 9, the restriction unit 11 further comprises a second part 14 fixedly connected to the body part 2 in the axial direction in relation to the body part in the first axial position of the axially movable part, and thus the second part is free to expand in a radial direction, i.e. a direction radial to the axial extension L. In FIG. 7, the axially movable part 12 has a base part 30 and an extending arm 31 having an inwardly extending projection 32 for engaging the second part 14 in the form of a projection 21 when the axially movable part 12 moves to the second axial position away from the metal sleeve 10. In FIG. 8, the second part 14 has a plurality of arms 31 with inwardly extending projections 32 for engaging a projection of the axially movable part 12. The base part 30 of the second part 14 has openings 33 for screwing the base part 30 to the body part 2. Thus, both the axially movable part 12 and the second part of the restriction unit may have a base part 30 and extending arms 31, each having an inwardly extending projection 32, and the other axially movable part and the second part have an engageable projection. As shown in FIG. 7, the arm(s) has a thickness t1 smaller than a thickness t2 of the base part 30. The arm(s) is thus made more flexible than the base part 30 so as to be able to bend radially outwards when forced past the projection and to flex inwards again after having passed the projection. The second part 14 may be the snap ring 18 (shown in FIG. 6) or a spring-loaded element 19 (shown in FIG. 5) movable radially and axially fixated in a first groove 20 in the body part 2.

In FIG. 10A, the restriction unit 11 has an axially movable part 12 abutting the metal sleeve 10 (indicated with a dotted line for illustration purposes), and the second part 14 of the restriction unit 11 has a base part 30 and a plurality of arms 31 with an inwardly extending projection 32 abutting the second part end 16 of the axially movable part 12. The base part 30 of the second part 14 is fastened to the body part 2. The axially movable part 12 is shown in the first axial position in FIG. 10A and in its second axial position in FIG. 10B. The axially movable part 12 is ring-shaped, and the second part end 16 thereof has an annular projection 34. Further, the axially movable part 12 comprises an intermediate section 35 having an outer diameter $OD_1$ smaller than that of the annular projection 34. In FIG. 10B, the arms have passed the annular projection 34 as the ring-shaped axially movable part 12 has been forced underneath the arms as the expandable tubular packer element 3 expands as shown in FIG. 10B. The first part end 15 of the axially movable part 12 has an inclined face 36 facing the metal sleeve 10, and the inclined face 36 corresponds to an inclined face 37 at the end of the metal sleeve 10. Hereby is meant that the inclined face of the axially movable part has a shape that corresponds to and matches a shape of an inclined face 37 at the end of the metal sleeve. When having a second restriction unit 11 at the other end of the metal sleeve 10, the metal sleeve 10 is fastened between the first and second restriction units 11 until the expandable tubular packer element 3 expands, forcing the axially movable parts 12 away from the expandable tubular packer element 3 and underneath the arms of the second parts 14, as shown in FIG. 10B. The smaller outer diameter of the intermediate section 35 enables the arms to bend inwards again after having passed the annular projections 34 engaging the axially movable parts 12.

FIG. 9 discloses a part view of a restriction unit 11 having an axially movable part 12 and a second part 14. The second part 14 has a plurality of arms 31 engaging a plurality of arms 31 of the axially movable part 12. The arms of the axially movable part 12 have projections 32 engaging grooves adjacent to the projections of the arms of the second part 14, and the arms of the second part 14 have projections 32 engaging grooves adjacent to the projections of the arms of the axially movable part 12. Each of the axially movable parts 12 and the second part 14 have a plurality of arms 31 distributed along the circumference of the body part 2.

FIG. 11 discloses an exploded view of yet another embodiment of a restriction unit 11 comprising an axially movable part 12 and a second part 14. The axially movable part 12 is a full ring but is shown in a cross-sectional view for illustrative purposes. The second part 14 has a base part 30 having a plurality of arms 31 projecting from the base part 30 in a direction of the axially movable part 12 and a plurality of second arms 41 projecting from the base part 30 away from the axially movable part 12. Each of the plurality of second arms 41 has an inner face 28 provided with grooves 42 for engaging an outer face of the body part 2. Each second arm 41 has an outer face having a part inclining away from the base part 30. The second part 14 further comprises a fastening ring 43 for sliding onto the outer face of the second arms 41, forcing the grooves 42 of the inner face 28 into engagement with the outer face of the body part 2 in order to fasten the second part 14 to the body part 2 without having to use screws. The fastening ring 43 has inwardly extending projections 46 inclining towards the second arms 41 so that when the fastening ring 43 is slid onto the outer face of the second arms 41, the inclined surface of the projections 46 functions as a wedge, forcing the grooves 42 even further into engagement with the outer face of the body part 2 the longer the fastening ring 46 is moved towards the base part 30. Furthermore, the axially movable part 12 has an indentation 38 in an outer face 44 of the axially movable part 12 in order to engage the inwardly extending projection 32 in the first axial position of the axially movable part 12. In the second axial position of the axially movable part 12, the inwardly extending projection 32 is forced to pass the annular projection 34 and slide further along the intermediate section 35 when the axially movable part 12 is forced away from the metal patch 10 as the expandable tubular packer element 3 expands. The axially movable part 12 also comprises the inclined face 22 assisting the expandable tubular packer element 3 in moving the axially movable part 12 away from the expandable tubular packer element 3 during expansion. The fastening ring 43 has a plurality of axially extending bores in order to fasten the fastening ring 43 to the base part 30 by means of e.g. screws.

By "fluid" or "well fluid" is meant any kind of fluid that may be present in oil or gas wells downhole, such as natural gas, oil, oil mud, crude oil, water, etc. By "gas" is meant any kind of gas composition present in a well, completion, or open hole, and by "oil" is meant any kind of oil composition, such as crude oil, an oil-containing fluid, etc. Gas, oil and water fluids may thus all comprise other elements or substances than gas, oil and/or water, respectively.

By "casing" or "well tubular metal structure" is meant any kind of pipe, tubing, tubular, liner, string, etc., used downhole in relation to oil or natural gas production.

In the event that the tool is not submergible all the way into the casing, a downhole tractor can be used to push the tool all the way into position in the well. The downhole tractor may have projectable arms having wheels, wherein the wheels contact the inner surface of the casing for propelling the tractor and the tool forward in the casing. A downhole tractor is any kind of driving tool capable of pushing or pulling tools in a well downhole, such as a Well Tractor®.

Although the invention has been described above in connection with preferred embodiments of the invention, it will be evident to a person skilled in the art that several modifications are conceivable without departing from the invention as defined by the following claims.

The invention claimed is:

1. A downhole packer assembly for expansion of a metal sleeve in a well downhole in a well tubular metal structure, the well having a top comprising:
   a body part having an axial extension, a first end facing downhole and a second end facing uphole towards the top of the well,
   an expandable tubular packer element surrounding the body part, and a first end and a second end of the expandable tubular packer element are fixedly connected with the body part, providing an expandable space therebetween, the expandable space being fillable with liquid during expansion, and a metal sleeve surrounding an exterior surface of the expandable tubular packer element, wherein a metal portion of the metal sleeve is positioned and configured to directly engage the well tubular metal structure, wherein the downhole packer assembly further comprises a restriction unit comprising an axially movable part, the axially movable part having a first axially movable part end facing the first end of the expandable tubular packer element and a second axially movable part end facing away from the expandable tubular packer element, the axially movable part having a first state in which the axially movable part is in a first axial position at least partly overlaps the expandable tubular packer element and a second state in which the axially movable part is in a second axial position axially displaced in relation to the first axial position away from the expandable tubular packer element, and wherein the metal sleeve is free to move radially outwards along with the expandable tubular packer element.

2. The downhole packer assembly according to claim 1, wherein the axially movable part has a length along the axial extension and overlaps the expandable tubular packer element by a distance being more than 10% of the length.

3. The downhole packer assembly according to claim 1, wherein the axially movable part is configured to move from the first axial position to the second axial position as the expandable tubular packer element expands and forces the axially movable part away from the expandable tubular packer element.

4. The downhole packer assembly according to claim 1, wherein the first part end of the axially movable part has an inclined face inclining from an end point radially inwards towards the body part.

5. The downhole packer assembly according to claim 1, wherein the axially movable part is maintained in the first axial position by a snap ring or a spring-loaded element movable in a first groove in the body part and engaging a first indentation in an inner face of the axially movable part.

6. The downhole packer assembly according to claim 1, wherein the restriction unit further comprises a second part fixed in the axial direction in relation to the body part in the first axial position of the axially movable part.

7. The downhole packer assembly according to claim 6, wherein the second part is a projection on the body part.

8. The downhole packer assembly according to claim 6, wherein the second part is a snap ring or a spring-loaded element movable radially and is axially fixated in a first groove in the body part.

9. The downhole packer assembly according to claim 1, further comprising a second restriction unit comprising an axially movable part, the axially movable part having a first part end facing the first end of the expandable tubular packer element and a second part end facing away from the expandable tubular packer element, the axially movable part having a first axial position in which the axially movable part at least partly overlaps the expandable tubular packer element and a second position in which the axially movable part is axially displaced in relation to the body part away from the expandable tubular packer element.

10. The downhole packer assembly according to claim 1, wherein the axially movable part comprises a base part and extending arms, each having an inwardly extending projection.

11. The downhole packer assembly according to claim 1, wherein the axially movable part is ring-shaped, the second part end having an annular projection, and the axially movable part comprising an intermediate section having an outer diameter smaller than that of the annular projection.

12. The downhole packer assembly according to claim 11, wherein the first part end of the axially movable part has an inclined face facing the metal sleeve.

13. The downhole packer assembly according to claim 12, wherein the inclined face has a shape that corresponds to a shape of an inclined face at the end of the metal sleeve.

14. The downhole packer assembly according to claim 1, wherein the axially movable part has an indentation in an outer face of the axially movable part.

15. A downhole system comprising the downhole packer assembly according to claim 1 and a driving unit configured to propel the downhole packer assembly in the well tubular metal structure.

16. The downhole packer assembly according to claim 1, wherein the second part of the restriction unit comprises a base part and extending arms, each having an inwardly extending projection.

17. The downhole packer assembly according to claim 1, wherein the axially movable part and the second part of the restriction unit comprise a base part and extending arms, each having an inwardly extending projection.

18. The downhole packer assembly according to claim 1, wherein the metal sleeve and the expandable tubular packer element are configured to separate after expansion.

* * * * *